United States Patent
Schmeling et al.

(10) Patent No.: US 7,878,752 B2
(45) Date of Patent: Feb. 1, 2011

(54) BEARING BETWEEN COMPONENTS ON CONSTRUCTION MACHINES

(75) Inventors: Ralf Schmeling, Berlin (DE); Bernhard Willaredt, Berlin (DE); Holger Oertel, Berlin (DE); Birgit Ditz, Potsdam (DE)

(73) Assignee: CNH Baumaschinen GmbH, Berlin (DE)

( * ) Notice: Subject to any disclaimer, the term of this patent is extended or adjusted under 35 U.S.C. 154(b) by 429 days.

(21) Appl. No.: 10/561,755

(22) PCT Filed: Jun. 11, 2004

(86) PCT No.: PCT/DE2004/001216

§ 371 (c)(1),
(2), (4) Date: May 16, 2006

(87) PCT Pub. No.: WO2005/008081

PCT Pub. Date: Jan. 27, 2005

(65) Prior Publication Data

US 2006/0251349 A1 Nov. 9, 2006

(30) Foreign Application Priority Data

Jun. 24, 2003 (DE) .................... 103 28 187

(51) Int. Cl.
B66C 23/00 (2006.01)
F16C 33/22 (2006.01)
E02F 3/96 (2006.01)

(52) U.S. Cl. ............ 414/686; 414/723; 384/276; 37/468

(58) Field of Classification Search .......... 403/38, 403/39, 52, 62, 150, 157–159, 161–163; 37/468; 414/686, 723; 384/276, 295, 428
See application file for complete search history.

(56) References Cited

U.S. PATENT DOCUMENTS

| 1,772,187 A | * | 8/1930 | Manning ............ 403/151 |
| 3,003,651 A | * | 10/1961 | Holopainen |
| 3,997,274 A | * | 12/1976 | Iverson ............. 403/38 |
| 4,096,957 A | | 6/1978 | Hagen |
| 4,191,431 A | * | 3/1980 | Roley et al. |
| 4,214,840 A | * | 7/1980 | Beales |
| 4,652,167 A | * | 3/1987 | Garman ............. 403/158 |
| 4,772,150 A | * | 9/1988 | Horton ............. 403/39 |
| 5,069,509 A | * | 12/1991 | Johnson et al. |
| 5,390,556 A | * | 2/1995 | Nencini et al. |
| RE35,432 E | * | 1/1997 | LaBounty et al. |
| 5,630,673 A | | 5/1997 | Krzywanos |
| 6,385,872 B1 | * | 5/2002 | Mieger et al. |

(Continued)

FOREIGN PATENT DOCUMENTS

CH 245252 * 10/1946

(Continued)

*Primary Examiner*—Victor MacArthur
(74) *Attorney, Agent, or Firm*—Patrick M. Sheldrake; Michael G. Harms

(57) ABSTRACT

A bearing for use between components of a construction machine, particularly on a boom on excavators, loaders, cranes, and related equipment having a first component articulated to a second component by the bearing and in which a third component acts on the bearing. The bearing assembly having a pin extending in the direction of a swiveling axis of the bearing, borne in a bearing tube.

7 Claims, 2 Drawing Sheets

U.S. PATENT DOCUMENTS

| | | | |
|---|---|---|---|
| 6,698,932 B2 * | 3/2004 | Hamaguchi et al. | |
| 6,877,259 B2 * | 4/2005 | Nishimura et al. | 403/324 |
| 6,962,458 B2 * | 11/2005 | Takayama et al. | 403/150 |
| 6,994,284 B1 * | 2/2006 | Ramun | |
| 7,287,949 B2 * | 10/2007 | Huissoon | |
| 2004/0228676 A1 * | 11/2004 | Oertley | 403/154 |

FOREIGN PATENT DOCUMENTS

| | | | |
|---|---|---|---|
| DE | 657146 | * | 2/1938 |
| DE | 926532 | * | 4/1955 |
| GB | 1559137 A | * | 1/1980 |
| GB | 2169582 A | * | 7/1986 |
| JP | 2000046037 A | * | 2/2000 |

* cited by examiner

BEARING BETWEEN COMPONENTS ON CONSTRUCTION MACHINES

FIELD OF THE INVENTION

The invention concerns a bearing between components of a construction machine, particularly on the boom of excavators, loaders, cranes, etc. whereby two or more components are articulated at a bearing point.

BACKGROUND OF THE INVENTION

A very frequently encountered embodiment of such a bearing is found between the back and mid constituents of the boom of self-propelled excavators, on which one boom cylinder acts on each side, as a third component. In this case the lower end of the back boom is mounted in a drag link on the frame of the revolving superstructure. The upper end of the upward-pointing back boom takes the form of an upward-opening fork, in which the rear area of the mid boom is accepted in said bearing, at a certain distance in front of the rear end of the mid boom, seen in the direction of movement of the self-propelled excavator, both parts being connected to each other by means of a pin.

To facilitate the swivel movement of the back boom, one end of the aforementioned hydraulic boom cylinder is mounted on the outer end of the bearing pin and the other end is articulated to a knuckle on the frame of the revolving superstructure at a certain distance from the drag link of the back boom. Both connections may be made either by cylindrical bearings or drag bearings.

Purely for the sake of completeness, it should be mentioned in respect of the design of the boom in this area that a hydraulic adjustment cylinder, the lower end of which is mounted on a bracket on a fixed pivot on the lower part of the back boom, acts on the rear end of the mid boom to raise and lower it. The front end of the mid boom and the downstream components, seen in the direction of movement of the self-propelled excavator, need not be considered further in this context as they are located too far away from the bearing and have no inherent connection with it.

From its center outwards, in cross-section, the bearing itself is designed so that the two bearing points of the mid boom are in the middle of the pin, into the borings of which penetrated by the pin guide bushes are pressed. The back boom envelopes the mid boom from below and outside, and accepts the pin close to the latter's outer ends in two plain bearings, into which guide bushes are also inserted, in the vicinity of its upper edge. The two ends of the pin protruding from the plain bearings are encompassed by the bosses of the boom cylinder, in which the aforementioned cylindrical bearings or drag bearings are located. End discs or rings attached externally prevent their axial displacement on the pin.

This solution has several disadvantages, namely that the connection between the three components, the back boom, mid boom and boom cylinder by means of the pin must accept the forces from all the components on its own in this embodiment, as a result of which it must have a correspondingly large diameter. However, a large diameter of the bearing point for the bosses of the boom cylinder means that the stroke of the boom cylinder and thus the maximum reach of the boom of the self-propelled excavator would be restricted. As this would be too serious of a disadvantage, the outer ends of the pin are turned down to a smaller diameter, entailing, however, a new disadvantage in the form of higher manufacturing costs. A further shortcoming arises from the use of cylindrical bearings for the aforementioned upper and lower mountings of the boom cylinder, because removal of the boom cylinders in this embodiment is then only possible if both connections are released and the boom cylinders are drawn out evenly to the side, to prevent tilting. Accordingly, analogous problems also arise on assembly. Although this assembly/removal problem is alleviated if drag bearings are used instead of cylindrical bearings, two new disadvantages emerge. Firstly, the drag bearings have a greater diameter than cylindrical bearings and thus restrict the reach of the boom, as aforementioned, and entail increased costs. Finally, a significant shortcoming of such bearings is that the back and mid boom fall apart when the pin is taken out when they are removed.

SUMMARY OF THE INVENTION

This invention is therefore based upon the problem of creating a bearing between construction machine components which can accept the high forces acting upon the components safely, which permits a long boom cylinder stroke and thus maximum boom reach by the machine, which permits simple assembly and removal of all the components, without having to separate the back and mid boom components from each other on removal and reassemble them on installation, and which can be manufactured cost-effectively in general.

By making the bearing for the first, second and third components in the form of a pin extending in the direction of their swiveling axis with the same diameter, borne in a bearing tube from which its outer ends protrude, this bearing is practically divided into a common bearing point for the first and second components, and for the back and mid boom in a preferred case, and a bearing point for the third component, the boom cylinder, in the same case. The first and second components are borne along-side each other on the external diameter of the bearing tube and the third component on the outer ends of the pin.

The external diameter of the bearing tube being considerably greater than the external diameter of the pin, the bearing tube accepts the forces from the first and second component more or less by itself and, due to its large external diameter, is also in a position to accept very high forces without any problems.

The pin can have a relatively small external diameter because it does not bear hardly any of the forces from the first and second components. Moreover, the forces from the third component, which the pin has to accept, are only transmitted to the ends of the pin protruding from the bearing tube, so that the bending moments acting on the pin are low and the pin can consequently have a small external diameter for this reason also. This again is the requirement for a long boom cylinder stroke, if the boom cylinder constitutes the third component.

In a practical embodiment of the invention, the bearing points of the first component, forming the back boom, are located on the middle of the bearing tube and the bearing points of the mid boom, forming the second component, are located along-side it on its outer parts. The associated insertion of the upper end of the back boom into the mid boom means that the back boom need no longer have gaps or recesses as in the reverse case, so that it is highly resistant to kinking. This design is very strong overall, as the section of the mid boom inserted over the back boom must then be larger than that of the back boom anyway and its weakening in the vicinity of the accepted back boom is slight, because only the actual angle of movement needs to be unobstructed as a fork.

In a further advantageous embodiment of the invention, the bearing points of the first and second components are fitted with guide bushes to reduce wear and noise, and to enhance the ease of movement of the bearing.

Another advantageous embodiment keeps the external diameter of the mid-section of the pin somewhat smaller than in the two outer sections, in order to minimize the length of the seats having the internal diameter of the bearing tube, which are difficult to manufacture.

In conclusion, the advantages of the invention are that this bearing can accept very high forces acting on the components. Its favorable structural design permits the use of a boom cylinder with a long stroke as the third component, so that the reach of the boom is very long. It also permits simple assembly and removal of all the components, without having to separate the back and mid booms during removal and reassembling them on assembly. It can also be manufactured cost-effectively.

DETAILED DESCRIPTION OF THE EXEMPLARY EMBODIMENTS

Figure 1:
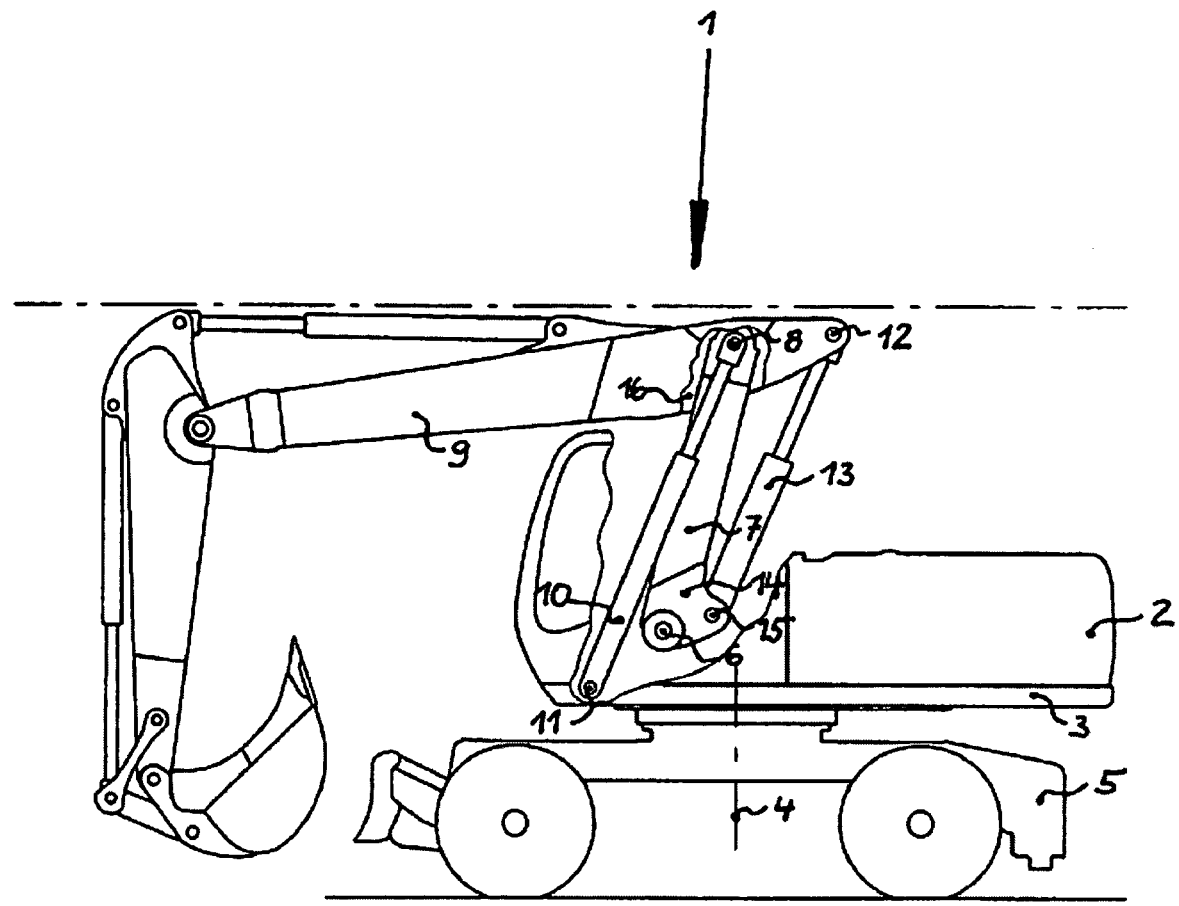
FIG. 1 is a side elevation of the left-hand side of the self-propelled excavator with a multiple boom.

The side elevation in FIG. 1 shows the structure of the multiple boom 1 which is mounted on the revolving superstructure 2 and attached to frame 3 of the body of a self propelled excavator. The revolving superstructure 2 can be swiveled in a horizontal plane about a vertically aligned axis 4 in relation to the chassis 5. It consists firstly of a back boom 7, designated the first component, the lower end of which is mounted in a drag link 6 on the frame 3. Its upper end is connected to the mid boom 9, designated the second component, by a bearing 8, said bearing 8 being located inside the mid boom 9, immediately below its upper edge, at a certain distance from its rear end. Two hydraulic boom cylinders 10 are provided as third components for executing the swivel movement of the back boom 7. At one end they act upon the bearing 8 and are mounted at the other end on a knuckle 11, which is located on the frame 3 at a certain distance in front of the drag link 6 of the back boom 7. For the sake of integrity in forming the multiple boom 1, a hydraulic adjustment cylinder 13 is added in this area, lying to the rear and thus pulling under load, acting on an articulation pin 12 located on the rear of the mid boom 9 to raise and lower it, the lower end of which hydraulic adjustment cylinder 13 is mounted on a bracket 14 on a fixed pivot 15 in the lower area of the back boom 7.

Figure 2:
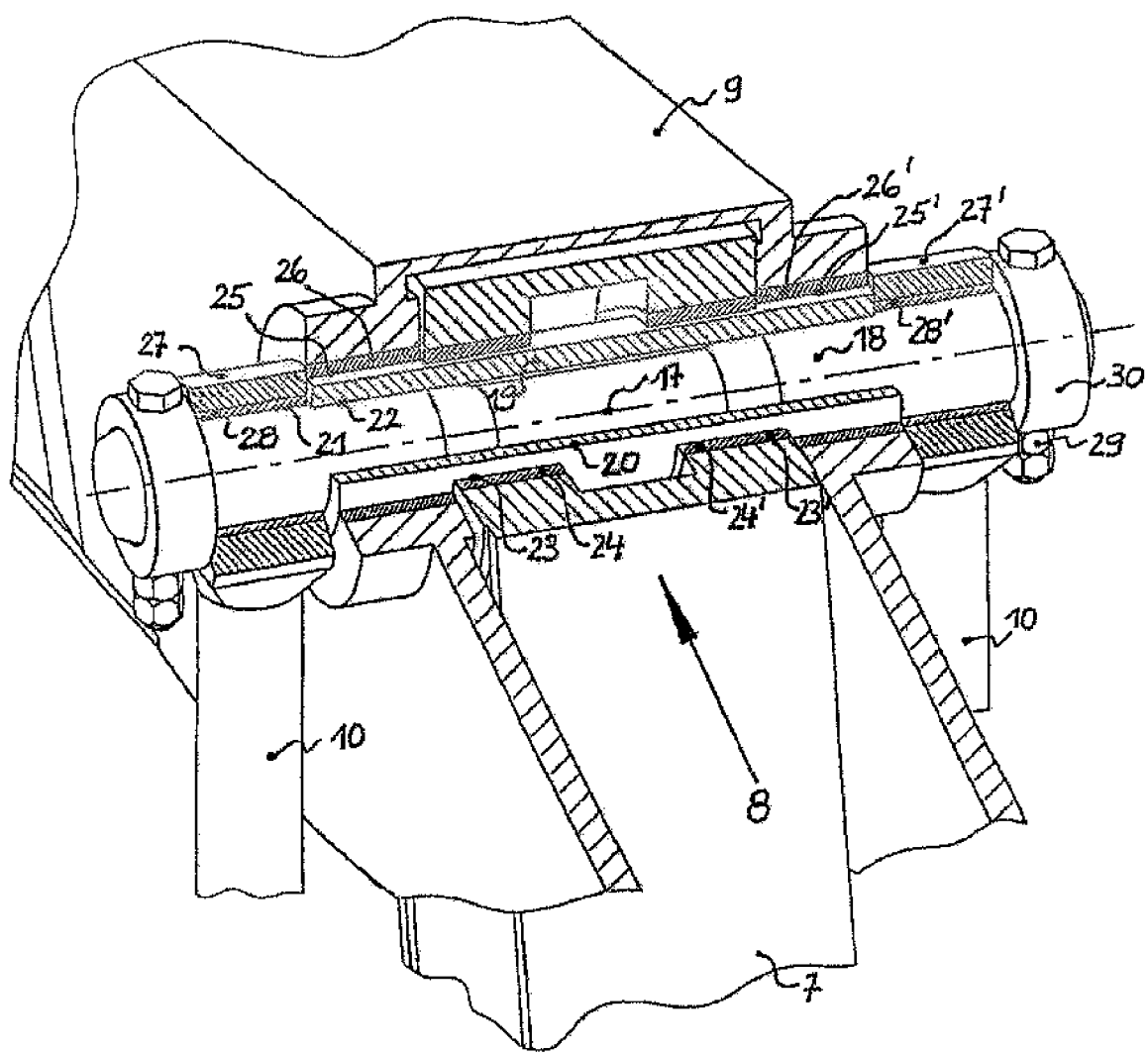
FIG. 2 is a three-quarter and partial cutaway view of the bearing for connecting the back boom with the mid boom and the boom cylinders acting on the mid boom.

An enlarged three-quarter and partial cutaway view of the bearing is shown in FIG. 2. In this illustration, the back boom 7, including its upper end, takes the form of a kink-proof box section, inserted in the mid boom 9 from below. In order that the mid boom 9 can be swiveled on the back boom 7 to a sufficient extent, it has a downward-opening fork 16 to accept the back boom 7, at least in the vicinity of the bearing 8 (see FIG. 1).

In detail, the bearing 8 is designed so that a pin 18 with an approximately constant diameter extends in the direction of its swiveling axis 17, said pin 18 protruding on either side from the width of the mid boom 9 with the back boom 7 inserted. Within the width of the mid boom 9, the pin 18 is borne in a bearing tube 19, the external diameter 20 of which is considerably greater than the external diameter 21 of the pin 18. In its mid section, the pin 18 has a slightly smaller external diameter 21 than in its outer parts, so that practically only the outer parts of the pin 18 are borne in the bearing tube 19.

The two bearing points 23 and 23' of the back boom 7 are located a certain distance apart on the external diameter 20 of the bearing tube 19, its guide bushes 24 and 24' being pressed into bores and sliding on the external diameter 20. Both the bearing points 25 and 25' of the mid boom 9 are located immediately outside alongside the bearing points 23 and 23' and their guide bushes 26 and 26', which are also pressed into bores, and also slide on the external diameter 20 of the bearing tube 19.

The bosses 27 and 27' of the two boom cylinders 10 form the outer end of the bearing 8, which are placed on the ends of the pin 18 protruding from the width of the mid boom 9. They are also fitted with guide bushes 28 and 28' sliding on the external diameter 21 of the pin 18. Rings 30 locked by a threaded connector 29 are applied to either end of the pin 18 to hold the entire bearing 8 in its axial direction.

What is claimed is:

1. A construction machine comprising:
a machine body;
a first boom component having a first end rotatably mounted to the machine body by a pivotal connection;
a second boom component articulated to a second end of the first boom component by a bearing, the bearing having a bearing tube with an internal and external diameter;
a pin extending in the direction of a swiveling axis of the bearing and received in the bearing tube, wherein the pin has outer ends protruding from ends of the bearing tube;
an adjustment cylinder connected to at least one of the outer ends of the pin, the external diameter of the bearing tube being greater than an external diameter of the pin; and
the first component and the second component are both located alongside each other on the external diameter of the bearing tube, the adjustment cylinder selectively transmitting a force to the pin through a connecting boss for rotating the first boom component with respect to the pivotal connection and rotationally displacing the bearing with respect to the pivotal connection, the displacement of the bearing rotating the second boom component with respect to the pin and first boom component.

2. The construction machine of claim 1, further comprising: a first set of bearing points on the first boom component located in contact with the middle of the bearing tube; a second set of bearing points of the second boom component located immediately outside of adjacent to the bearing points of the first boom component, and the bearing points of both the first and second boom component being slidable on the external diameter of the bearing tube.

3. The construction machine of claim 2 wherein, the bearing points of the first and second components are fitted with guide bushings.

4. The construction machine of claim 1 wherein, the second boom component is inserted over the first boom component such that the second boom component is supported by and moves with the first boom component, the second boom component having a first pivotal connection at the bearing with the first boom component.

5. The construction machine of claim 1, wherein an external diameter of a mid-section of the pin is less than an external diameter at either end of the pin.

6. The construction machine of claim 1, wherein a ring having a locking connector is inserted over both ends of the pin and maintains the axial alignment of the components located therebetween.

7. The construction machine of claim 1, wherein the machine is a wheeled or crawler track excavator, wherein wheels or crawler track are connected to the machine body.

* * * * *